(12) United States Patent
Magno, Jr.

(10) Patent No.: US 9,059,580 B2
(45) Date of Patent: *Jun. 16, 2015

(54) CURING SYSTEM FOR SEALING AN ELECTRICAL FITTING

(71) Applicant: Thomas & Betts International, Inc., Wilmington, DE (US)

(72) Inventor: Joey D. Magno, Jr., Cordova, TN (US)

(73) Assignee: Thomas & Betts International, LLC, Wilmington, DE (US)

( * ) Notice: Subject to any disclaimer, the term of this patent is extended or adjusted under 35 U.S.C. 154(b) by 202 days.

This patent is subject to a terminal disclaimer.

(21) Appl. No.: 13/658,418

(22) Filed: Oct. 23, 2012

(65) Prior Publication Data

US 2013/0118803 A1    May 16, 2013

Related U.S. Application Data

(60) Provisional application No. 61/558,175, filed on Nov. 10, 2011.

(51) Int. Cl.
*H02G 15/04* (2006.01)
*H02G 15/013* (2006.01)

(52) U.S. Cl.
CPC .................................. *H02G 15/013* (2013.01)

(58) Field of Classification Search
CPC .... H02G 15/04; H02G 15/043; H02G 15/046
See application file for complete search history.

(56) References Cited

U.S. PATENT DOCUMENTS

| | | | |
|---|---|---|---|
| 3,113,284 A | 12/1963 | Inthougt | |
| 4,208,005 A | 6/1980 | Nate et al. | |
| 4,415,604 A | 11/1983 | Nativi | |
| 4,544,231 A | 10/1985 | Peterson | |
| 4,549,037 A * | 10/1985 | Bawa et al. | 174/667 |
| 4,714,432 A | 12/1987 | Huggins | |
| 4,797,509 A | 1/1989 | Cook | |
| 4,820,196 A | 4/1989 | Roselle et al. | |
| 4,998,894 A | 3/1991 | Gronvall | |
| 5,057,348 A | 10/1991 | Drain et al. | |
| 5,099,088 A | 3/1992 | Usami et al. | |
| 5,166,558 A | 11/1992 | Ohsawa | |
| 5,278,357 A * | 1/1994 | Yamanashi | 174/151 |
| 5,399,807 A * | 3/1995 | Yarbrough et al. | 174/653 |
| 5,418,016 A | 5/1995 | Cornforth et al. | |
| 5,438,080 A | 8/1995 | Ohama et al. | |
| 5,438,160 A | 8/1995 | Batty | |
| 5,518,415 A * | 5/1996 | Sano | 439/204 |
| 5,536,758 A | 7/1996 | Boldt | |

(Continued)

*Primary Examiner* — James Sanders

(74) *Attorney, Agent, or Firm* — Snyder, Clark, Lesch and Chung, LLP

(57) ABSTRACT

A system for curing a sealing compound provided in an electrical fitting, includes a curing chamber for receiving at least a portion of the electrical fitting therein, wherein the electrical fitting received within the curing chamber comprises a body and a sealing sleeve configured to engage the forward end of the body during assembly of the fitting to receive the two or more conductors of an electrical cable passing through the body. The sealing sleeve is configured to receive an ultra-violet (UV)-curable sealing compound therein, such that the sealing compound flows between the two or more conductors during filling of the sealing sleeve. The system further includes a plurality of UV light sources configured to provide UV light into the curing chamber to cure the UV-curable sealing compound and to initiate curing of the UV-curable sealing compound in the sealing sleeve.

22 Claims, 11 Drawing Sheets

(56) References Cited

U.S. PATENT DOCUMENTS

| | | |
|---|---|---|
| 5,809,635 A | 9/1998 | Aoyagi et al. |
| 5,846,075 A | 12/1998 | Suh et al. |
| 6,306,502 B1 | 10/2001 | Fukushima et al. |
| 6,520,663 B1 | 2/2003 | Holmes et al. |
| 6,596,787 B1 | 7/2003 | Levandoski et al. |
| 6,676,795 B1 | 1/2004 | Levandoski |
| 6,881,964 B2 | 4/2005 | Holmes |
| 6,943,202 B2 | 9/2005 | Zhu et al. |
| 6,972,413 B1 | 12/2005 | Krogdahl et al. |
| 6,998,425 B2 | 2/2006 | Chisholm et al. |
| 7,479,653 B2 | 1/2009 | Gillissen et al. |
| 7,736,165 B2 * | 6/2010 | Bukovnik et al. ............. 439/276 |
| 7,790,094 B2 | 9/2010 | Lim et al. |
| 7,915,319 B2 | 3/2011 | Konarski et al. |
| 8,581,120 B2 * | 11/2013 | Winship ........................ 174/667 |
| 2007/0161268 A1 * | 7/2007 | Muschketat ................. 439/76.1 |
| 2009/0163064 A1 | 6/2009 | Janulis et al. |
| 2010/0108020 A1 * | 5/2010 | Miretti ..................... 123/198 D |
| 2011/0115132 A1 | 5/2011 | Burdzy et al. |

\* cited by examiner

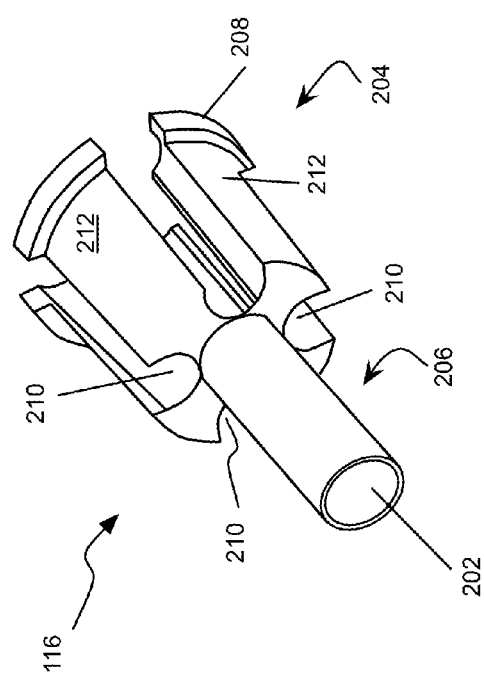
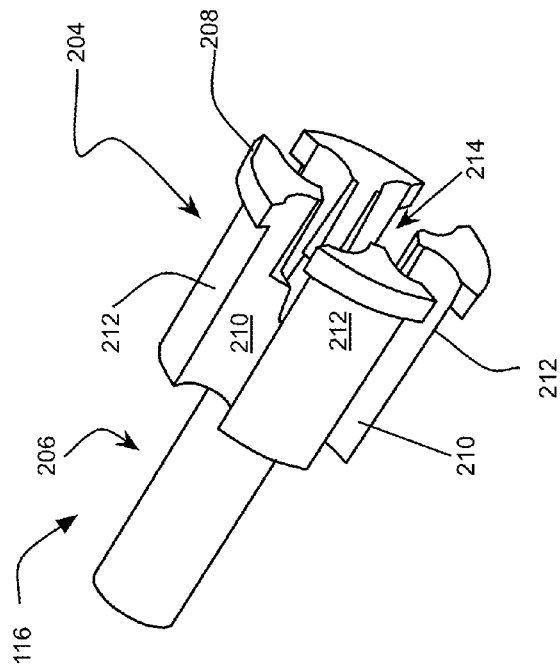
FIG. 2A
FIG. 2B

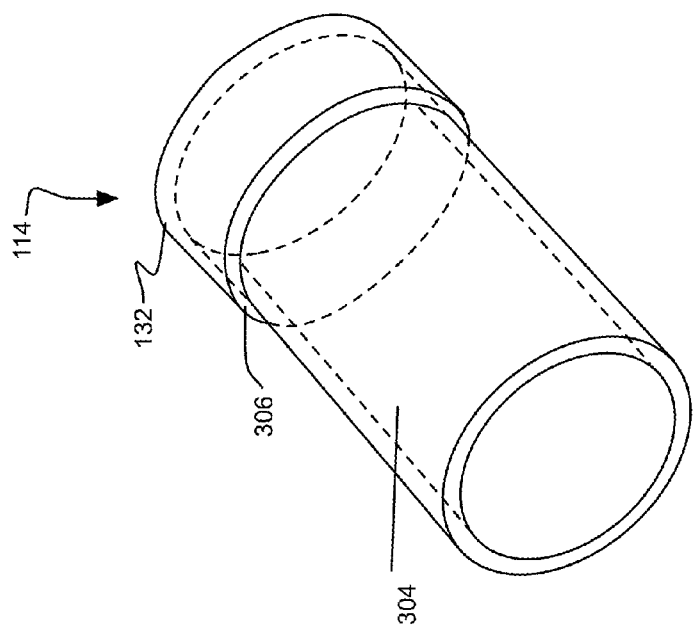
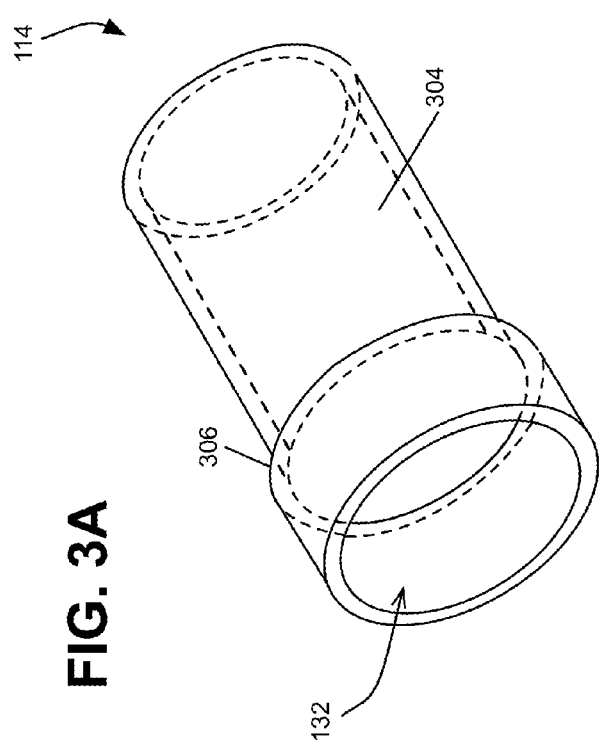

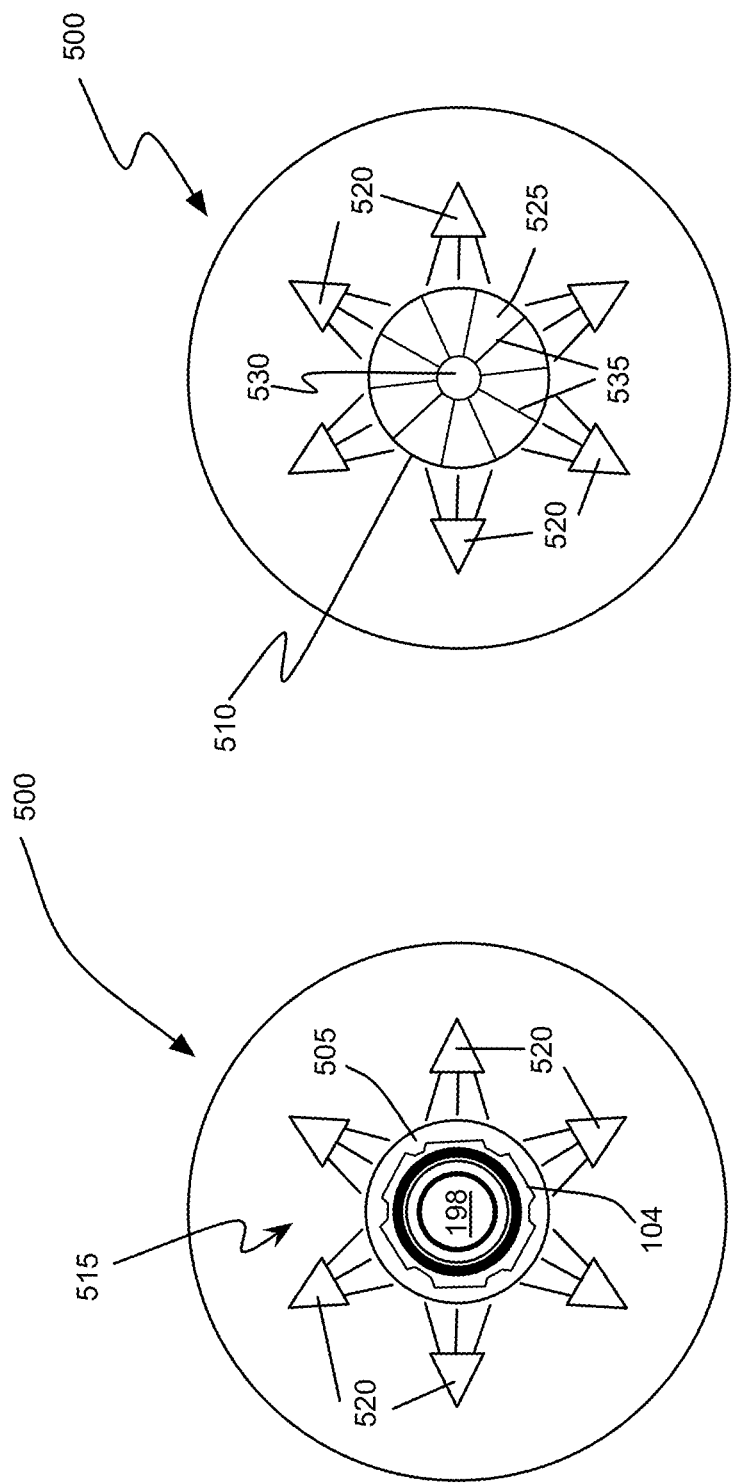

CURING SYSTEM FOR SEALING AN ELECTRICAL FITTING

CROSS-REFERENCE TO RELATED APPLICATION

This application claims priority under 35. U.S.C. §119, based on U.S. Provisional Patent Application No. 61/558,175 filed Nov. 10, 2011, the disclosure of which is hereby incorporated by reference herein.

BACKGROUND OF THE INVENTION

Connectors and fittings have long been used to terminate and connect cables or conduits that carry electrical power or communication signals. Electrical cables are supplied in various configurations often based upon a particular use or the location in which the cables are to be used. One type of electrical cable includes a metallic outer sheath or cladding, sometimes referred to as armor. This type of cable may include a number of insulated conductors extending within the metallic sheath.

Connectors used to terminate these types of cables are typically configured to seal the cable to the connector and also provide for grounded electrical engagement between the metallic sheath of the cable and the body of the connector. In high voltage environments, it may be necessary to seal conductors within the cable in an air-tight fashion to eliminate the possibility of arcing or flashover between the conductors.

Known sealing compounds for use in conjunction with electrical fittings require lengthy curing times at relatively high temperatures (e.g., >70° Fahrenheit). This may be problematic in cold temperature environments, such as in outdoor installations.

BRIEF DESCRIPTION OF THE DRAWINGS

FIGS. 2A and 2B are rear and front isometric views, respectively, of an exemplary embodiment of the sealing cartridge of FIG. 1A;

FIGS. 3A and 3B are rear and front isometric views, respectively, of an exemplary embodiment of the sealing sleeve of FIG. 1A;

FIGS. 5B and 5C are top and bottom views, respectively, of the sealing compound curing assembly of FIG. 5A.

DETAILED DESCRIPTION OF THE PREFERRED EMBODIMENTS

The following detailed description refers to the accompanying drawings. The same reference numbers in different drawings may identify the same or similar elements. Also, the following detailed description does not limit the invention.

One or more embodiments disclosed herein may relate to a system and/or apparatus for curing a sealing compound for use in an electrical cable fitting. More specifically, an electrical fitting for use with such a system may include an exposed transparent sealing sleeve and a transparent sealing cartridge received within the sleeve. The sealing cartridge may include radial notches therein for receiving divided conductors of the electrical cable therein and maintaining the conductors in a spaced relationship with respect to each other within the fitting. During initial, partial assembly of the fitting, a ultraviolet light (UV) curable sealing compound is delivered to the sealing sleeve and allowed to flow between and around the conductors and the sealing cartridge to prevent arcing between the conductors.

The exposed transparent sealing sleeve, including the divided conductors of the electrical cable and the sealing compound, may be placed within a curing apparatus. Consistent with embodiments described herein, the curing apparatus may include a hollow curing chamber that includes an access aperture at one end. The curing chamber includes an array of radially positioned UV light sources, such as UV light bulbs. The sealing sleeve may be inserted within the curing chamber via the access aperture and the UV light sources may be activated to cure the UV curable sealing compound in the sealing sleeve.

Figure 1A:
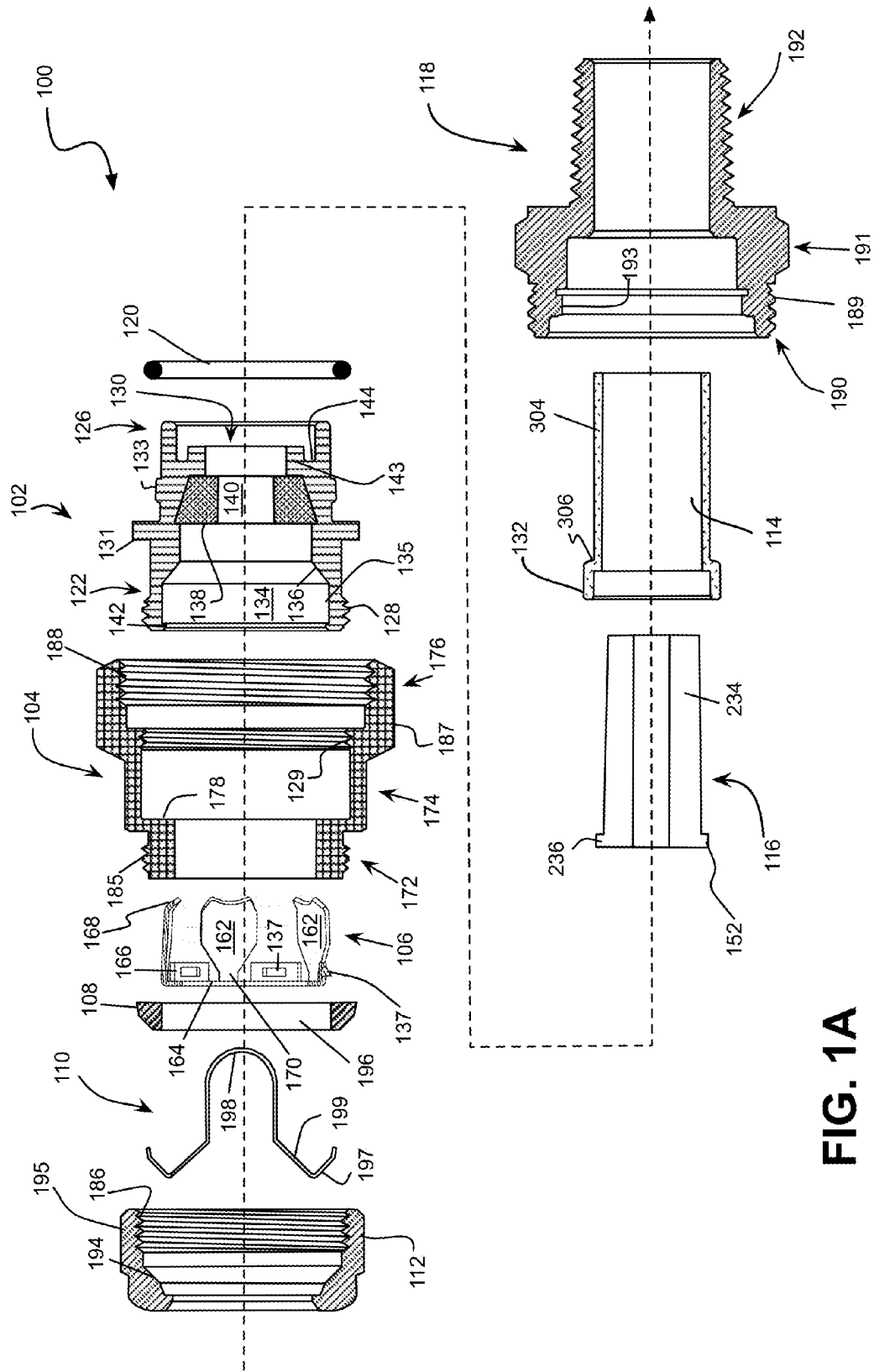
FIG. 1A is an exploded cross-sectional view of an exemplary embodiment of an explosion-resistant electrical cable fitting consistent with implementations described herein.
Figure 1B:
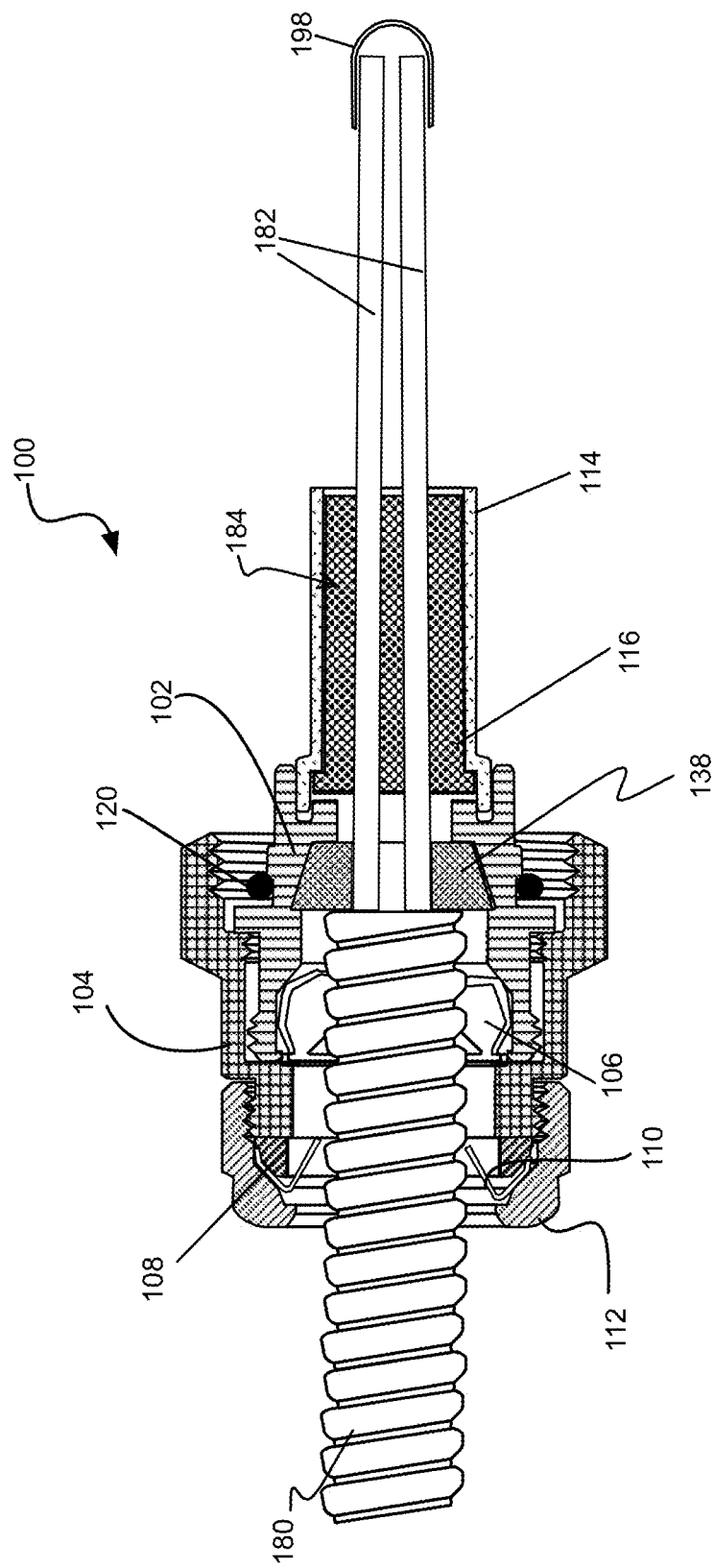
FIG. 1B is a cross-sectional view of the electrical fitting of FIG. 1A in a partially assembled configuration.

FIG. 1A is an exploded cross-sectional view of an exemplary embodiment of an electrical cable fitting 100 consistent with implementations described herein. FIG. 1B is a cross-sectional view of fitting 100 in an assembled configuration. As illustrated in FIGS. 1A and 1B, fitting 100 may include a body 102, a main nut 104, a grounding element 106, a compression bushing 108, a cap guide 110, a gland nut 112, a sealing sleeve 114, a sealing cartridge 116, a hub nut 118, and an O-ring 120. In the following description, the relative terms "rearward" and "forward" are used to designate various portions or components of fitting 100 in reference to a direction of insertion of an electrical cable therein. It should be understood that these terms are descriptive only and that in some implementations, the terms may be reversed, such as in reference to a removal of the electrical cable from fitting 100.

As shown in FIG. 1A, body 102 may include an elongate hollow generally tubular member having an enlarged cable receiving end 122, an intermediate portion 124, and a smaller conductor egressing end 126 opposing cable receiving end 122. Cable receiving end 122 may include external threads 128 formed thereon for engaging internal threads 129 in main nut 104 in the manner described below. Conductor egressing end 126 may include a sleeve receiving portion 130 configured to engage a rearward end 132 of sealing sleeve 114 during assembly of fitting 100. An external annular flange 131 and annular rib 133 may be provided between cable receiving end 122 and conductor egressing end 126. As described below, flange 131 may engage a portion of main nut 104 and act as a positive stop during assembly of fitting 100. Further, as shown in FIG. 1B, flange 131 and rib 133 may together engage O-ring 120 to provide seal fitting 100 from outside environmental moisture. In some embodiments, rib 133 may include a splined or grooved outer configuration for mating with a corresponding splined configuration on an inside surface of hub nut 118, as described below.

Body 102 may include an internal central bore 134 extending along a central longitudinal axis (depicted as a dashed line in FIG. 1A) between cable receiving end 122 and conductor egressing end 126. In one embodiment, central bore 134 may include an angled annular portion 136 for engaging grounding element 106.

Cable receiving end 122 of body 102 may also include an internal annular notch 135 for engaging corresponding barb elements 137 formed in an annular body 141 of grounding element 106 during insertion of grounding element 106 into cable receiving end 122 of body 102. As shown, annular notch 135 in body 102 may be formed by annular rim 142 projecting radially inwardly from cable receiving end 122 of body 102. In some embodiment, annular rim 142 may include an angled configuration for facilitating insertion of ground element 106 into central bore 134.

As shown in FIG. 1A, integrated sealing barrier 138 may be provided within body 102 and may include a tubular bore 140 formed therein for resiliently receiving a portion of an electrical cable inserted therethrough (see, e.g., cable 180 in FIG. 1B). In some implementations, sealing barrier 138 may be formed of a resilient material, such as latex, rubber, etc. As described below, during assembly of fitting 100, sealing barrier 138 may engage inserted electrical cable 180 and prevent the injected or distributed sealing compound from flowing into a portion of fitting 100 rearward of barrier 138. In some embodiments, sealing barrier 138 may be formed or positioned with body 102 prior to assembly of fitting 100, e.g., during the manufacture of fitting 100.

Sleeve receiving portion 130 of body 102 may include an internal tubular portion 143 projecting radially inwardly from tubular bore 140 and having an inside diameter smaller than the inside diameter of the remainder of body 102. A rearward end of internal tubular portion 140 may receive/engage a forward end of sealing barrier 138.

As shown in FIG. 1A, the forward end of internal tubular portion 143 may include an annular groove 144 formed therein for receiving rearward end 132 of sealing sleeve 114, as described below. In addition, the forward end of tubular portion 143 may have an internal diameter sized to receive the exposed conductors of electrical cable 180 and may be larger than an outside diameter of a rearward portion of sealing cartridge 116, thus effectively retaining sealing cartridge 116 within sealing sleeve 114 upon assembly (or partial assembly) of fitting 100.

In other implementations, conductor egressing end 126 may include a sleeve engaging portion configured to engage a rearward end 132 of sealing sleeve 114 during assembly of fitting 100. For example, conductor egressing end 126 of body 102 may be sized to be received within rearward end 132 of sealing sleeve 114.

FIGS. 2A and 2B are front and rear isometric views, respectively, of an exemplary sealing cartridge 116. As shown, in FIGS. 2A, and 2B, sealing cartridge 116 may have a generally tubular configuration to be received within sealing sleeve 114, as described below. Sealing cartridge 116 may include a central bore 202 formed therethrough, conductor separating portion 204, and a sealant administration portion 206. Conductor separating portion 204 may include an annular shoulder 208 and a number of radially spaced conductor maintaining notches or slots 210 formed axially in a periphery of conductor separating portion 204.

Figure 1C:
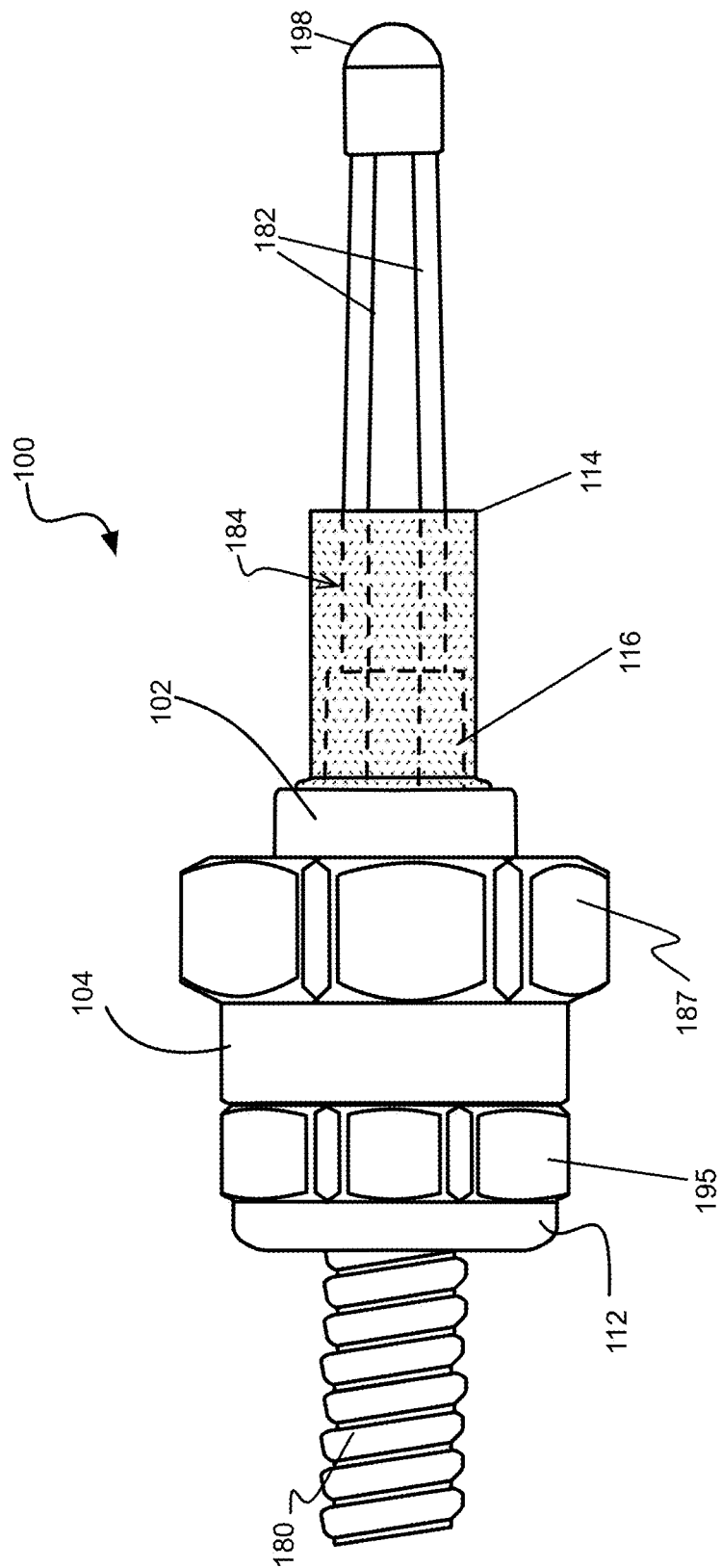
FIG. 1C is a side view of the partially assembled electrical fitting of FIG. 1B.

In one implementation, annular shoulder 208 is formed at a rearward end of cartridge 116 and may be configured to engage a corresponding shoulder portion 306 (FIG. 3A) in sealing sleeve 114, during insertion of sealing cartridge 116 into sealing sleeve 114. As shown in FIGS. 2A and 2B, in one embodiment, each of slots 210 may having a generally cylindrical configuration, although other non-cylindrical shapes or cross-sections may also be used. Additionally, conductor separating portion 204 may include a number of rearwardly projecting portions 212 corresponding to the number of slots 210. Rearwardly projecting portions 212 may be configured to extend slots 210 beyond an internal length of central bore 202 in cartridge 116, such that a sealant receiving chamber 214 is formed between rearwardly projecting portions 212. Upon assembly, sealant receiving chamber 214 is positioned between electrical cable conductors 182 (two of which are shown in FIGS. 1B and 1C) received within slots 210. As described below, sealant receiving chamber 214 allows for efficient distribution of sealing compound around and between the conductors during assembly of fitting 100.

Formed in a forward end of cartridge 116, sealant administration portion 206 may form a tube for administering a sealing compound (also referred to as a sealant) to sealant receiving chamber 214 via central bore 202. In some embodiments, as shown in FIG. 2A, an outside diameter of sealant administration portion 206 may be sized so as to align with a radially inward portion of slots 210, thereby allowing electrical cable conductors 182 received within slots 210 to lay substantially flat against sealant administration portion 206.

Although four slots are shown in FIGS. 2A and 2B, it should be understood that any suitable number of slots for receiving a corresponding number of electrical cable conductors may be provided in cartridge 116. In this manner, sealing cartridge 116 may provide a modular mechanism for handling electrical cables having different numbers of conductors in a common fitting design.

Figure 2D:
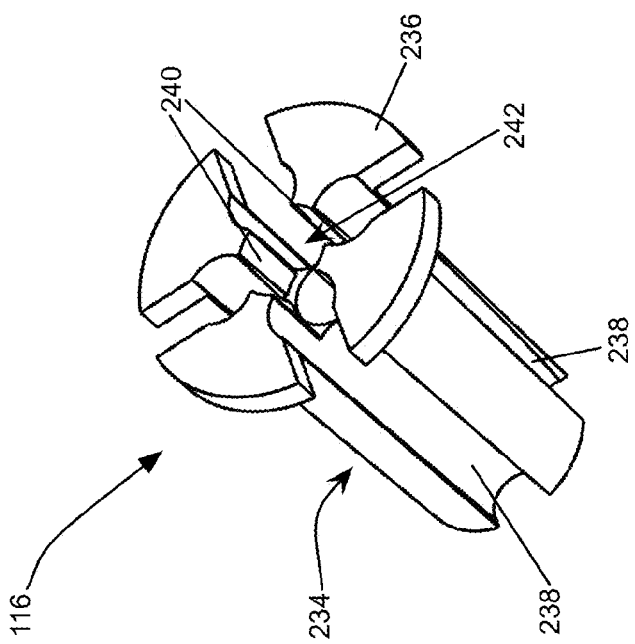
FIGS. 2C and 2D are rear and front isometric views, respectively, of another embodiment of the sealing cartridge of FIG. 1A.
Figure 2C:
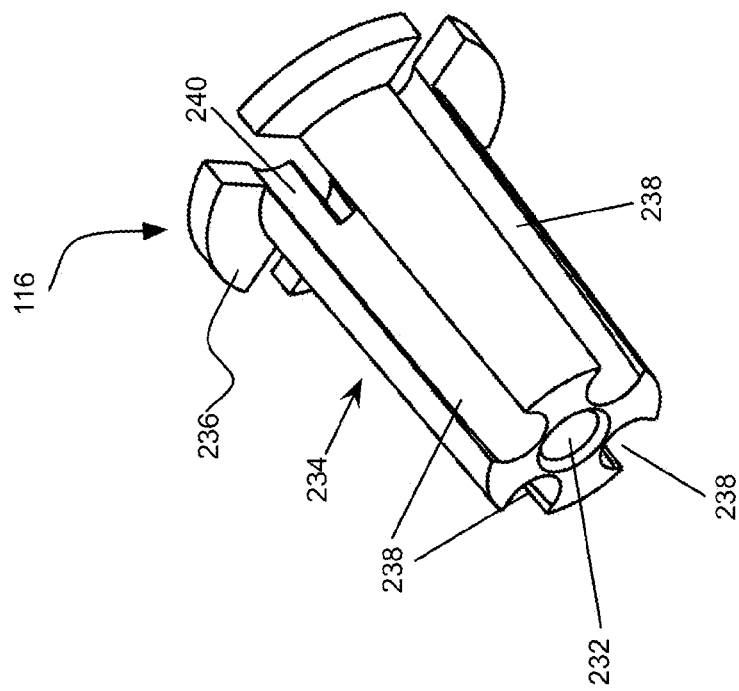

FIGS. 2C and 2D are rear and front isomeric views, respectively, of an alternative embodiment of sealing cartridge 116. In the embodiment of FIGS. 2C and 2D, sealing cartridge 116 may again have a generally tubular configuration to be received within sealing sleeve 114. Sealing cartridge 116 may include a central bore 232 formed therethrough and may include a number of conductor separating portions 234 formed in an outer periphery thereof. Conductor separating portions 234 may include an annular shoulder 236 and a number of radially spaced conductor maintaining notches or slots 238 formed axially in a periphery of cartridge 116.

In one implementation, annular shoulder 236 may be formed at a rearward end of cartridge 116 and may be configured to engage a corresponding shoulder portion 306 in sealing sleeve 114, during insertion of sealing cartridge 116 into sealing sleeve 114, as described above with respect to FIGS. 2A and 2B. As shown in FIG. 2C, in one embodiment, slots 238 may have a generally cylindrical configuration, although other non-cylindrical shapes or cross-sections may also be used. As also shown in FIG. 2C, notches 238 may extend along an entire length of cartridge 116.

Additionally, as shown in FIG. 2C, conductor separating portion 234 may include a number of rearwardly projecting portions 240 corresponding to the number of slots 238. Rearwardly projecting portions 240 may be configured to extend slots 238 beyond an internal length of central bore 232 in cartridge 116, such that a sealant receiving chamber 242 is formed between rearwardly projecting portions 240. Sealant receiving chamber 242 allows for efficient distribution of sealing compound around and between the conductors during assembly of fitting 100 when the sealing compound is directed through central bore 232.

Consistent with embodiments described herein, sealing cartridge 116 may include a sufficient volume relative to a total volume of sealing sleeve 114 so as to enable efficient curing of UV-curable sealing compound 184. For example, conductor separating portion 234 and rearwardly projecting portions 240 may be sized so as to provide a maximum thickness of sealing compound 184 of approximately 0.125 inches, thereby enabling efficient activation and curing of sealing compound 184. Moreover, sealing cartridge 116 is configured such that sealing compound 184 may flow downwardly through bore 202/232 and into sealant receiving chamber 214/242. Continued injection of sealing compound 184 may cause sealing compound 184 to flow upwardly through slots 210/238 and around conductors 182. This configuration causes any air bubbles or voids in sealing compound 184 to rise upward toward a surface of sealing compound 184, thereby eliminating such voids and bubbles within sealing sleeve 114.

FIGS. 3A and 3B are rear and front isometric views of an exemplary sealing sleeve 114. As shown, in FIGS. 1A, 3A, and 3B, sealing sleeve 114 may include rearward end 132 and a forward end 304 having a tubular configuration. Rearward end 302 may include a shoulder portion 306 having larger inside and outside diameters relative to the remainder of sealing sleeve 114, as described above. In one embodiment, an inside diameter of shoulder portion 306 may be sized to receive annular shoulder 208/236 in cartridge 116. As described briefly above, in one exemplary embodiment, annular groove 144 in internal tubular portion 143 of body 102 may receive rearward end 302 of sealing sleeve 114. In some implementations, an axial length of shoulder portion 306 may be sized substantially similarly to an axial distance from conductor egressing end 126 of body 102 and a rearwardmost portion of annular groove 144.

Consistent with embodiments described herein, an inside diameter of forward end 304 of sealing sleeve 114 may be substantially similar to an outside diameter of conductor separating portion 204/234 of sealing cartridge 116, such that sealing sleeve 114 may axially receive sealing cartridge 116 therein, upon placement of electrical cable conductors 182 within slots 210/240.

During assembly, electrical cable conductors 182 may be inserted through tubular bore 140 in integrated sealing barrier 138 and positioned within slots 210/240 in sealing cartridge 116. Cartridge 116 may be seated within sealing sleeve 114 and sealing sleeve 114 may then be axially received within annular groove 144 in internal tubular portion 143 of body 102. As shown below in FIG. 5A, in some implementations, fitting 100 may be positioned vertically during assembly, such that sealing sleeve 114 and conductors 182 project upwardly from body 102. A UV-curable sealing compound 184 (shown in a checkerboard pattern in FIG. 1B) may be inserted or injected into central bore 202/232 via sealant administration portion 206 and allowed to flow into sealant receiving chamber 212/242, abut sealing barrier 138, and flow around and between electrical cable conductors 182 received within slots 210/240 while filling sealing sleeve 114. The vertical orientation of fitting 100 may provide a gravity assisted flow of sealing compound 184.

Consistent with embodiments described herein, each of sealing sleeve 114 and sealing cartridge 116 may be formed of a transparent material, such as a transparent plastic, to allow penetration of UV light into sealing compound 184 to facilitate curing. Further, the transparent material may facilitate visible inspection and confirmation that complete distribution of the sealing compound between and around conductors 182 has been accomplished. In other implementations, sealing sleeve 114 and/or sealing cartridge 116 may be formed of a partially transparent or translucent material.

In still other implementations, sealing sleeve 114 and/or sealing cartridge 116 may be formed to include both transparent and non-transparent portions. For example, sealing sleeve 114 may include a metallic body with a sight glass or other transparent portion or window formed therein. Direction of UV light through the sight glass allows for the UV light to activate and cure sealing compound 184. In some embodiments, the metallic body may include a reflective inner surface to facilitate reflection of the UV light through sealing compound 184.

Returning to FIG. 1A, grounding element 106 may be configured for positioning within cable receiving portion 122 of body 102 and may include a substantially annular configuration and a number of axially extending resilient contact fingers 162. Upon threading main nut 104 onto body 102 (as described below), contact fingers 162 may be deflected inwardly by first angled annular portion 136 in central bore 134. This deflection causes contact fingers 162 to engage a metallic sheath/cladding of the electrical cable. Such engagement provides mechanical and electrical contact with the outer cladding of cable 180 inserted into body 102 and main nut 104.

As shown, grounding element 106 may include a substantially annular body 164 defining a central opening therein. Contact fingers 162 may extend from annular body 164 in a radially spaced configuration. As shown, contact fingers 162 may project inwardly toward the central opening of annular body 164. Further, annular body 164 may include forwardly extending barb portions 166 extending from annular body 164 in between contact fingers 162. Each barb portion 166 may include a barb element 137 projecting outwardly therefrom in a barbed or angled configuration. Upon insertion of grounding element 106 into cable receiving end 122, barb elements 137 may engage notch 135 and rim 142 in body 102, thereby retaining grounding element 106 in body 102 following assembly.

As shown in FIG. 1A, each of contact fingers 162 may include a substantially curved end portion 168 and a proximal region 170 connected to annular body 164. Curved end portions 168 may be configured to engage an outer surface of the metallic sheath of an electrical cable, as shown in FIG. 1B. In some implementations, the relative thickness of proximal region 170 may be reduced relative to a remainder of each contact finger 162.

Returning to FIG. 1A, main nut 104 may include an elongate hollow generally tubular member having a rearward cable receiving end 172, an intermediate portion 174, and a forward end 176. As shown, rearward cable receiving end 172, intermediate portion 174, and forward end 176 may be formed in a substantially annularly notched configuration, such that rearward cable receiving end 172 has smaller inside and outside diameters than intermediate portion 174, and intermediate portion 174 has smaller inside and outside diameters than forward end 176. For example, an inside diameter of rearward cable receiving end 172 may be sized to accommodate a metallic sheath/cladding of electrical cable 180 inserted therethrough. An inside diameter of intermediate portion 174 may be sized to accommodate cable receiving end 122 of body 102, as shown in FIG. 1B. A shoulder 178 may be formed at an internal transition between rearward cable receiving end 172, intermediate portion 174. As shown in FIG. 1B, shoulder 178 may engage annular body 402 of grounding element 106 upon engagement of main nut 104 with hub nut 118, as described below.

In one embodiment, rearward cable receiving end 172 may include external threads 185 formed thereon for engaging internal threads 186 in gland nut 112. Additionally, an axial length of intermediate portion 174 may provide an area for marking certifications and branding. A forward portion of intermediate portion 174 may be provided with internal threads 129 for engaging external threads 128 in body 102 during an intermediate assembly of fitting 100. For example, when fitting 100 is assembled such that threads 128 engage threads 129, grounding element 106 may be in an uncompressed state, thereby allowing electrical cable 180 to be inserted into fitting and yet maintain body in a retained relationship with respect to main nut 104.

Forward end 176 of main nut 104 may include a tool engaging outer surface 187. For example, outer surface 187 may include a hexagonal configuration on at least a portion thereof for engaging a torque applying tool, such as a wrench. In other implementations, other engagement surfaces may be used, such as knurling, notching, etc. Forward end 176 may include internal threads 188 for engaging external threads 189 provided on a rearward end 190 of hub nut 118, during final assembly of fitting 100, following curing of sealing compound 184 in sealing sleeve 114, as described below.

Hub nut 118 may include an elongate hollow generally tubular member that includes rearward end 190, an intermediate portion 191, and a forward end 192. As shown, rearward cable receiving end 190, intermediate portion 191, and forward end 192 may be formed in a substantially annularly notched configuration, such that rearward end 190 has a larger inside diameter than intermediate portion 191, and intermediate portion 191 has larger inside diameter than forward end 192.

As described above, rearward end 190 includes external threads 189 for engaging internal threads 188 in main nut 104. Additionally, as shown in FIGS. 1A and 1B, inside diameter of rearward end 190 may include annular rib 193 positioned to correspond with annular rib 133 in body 102 to engage O-ring 120 during assembly. As described above, in some embodiments ribs 193 and 133 may include mating spline surface configurations, thereby restricting rotation of hub nut 118 relative to body 102 upon assembly.

Intermediate portion 191 of hub nut 118 may include an inside diameter sized to accommodate forward end 126 of body 102. Further, intermediate portion 191 may include an outer tool engagement surface, such as a hexagonal configuration for engaging a tool during tightening of hub nut 118 relative to main nut 104 or on a housing or other structure (not shown) for receiving fitting 100.

Forward end 192 of hub nut 118 may include an inside diameter sized to accommodate sealing sleeve 114. For example, following distribution and curing of sealing compound 184 within sealing sleeve 114, hub nut 118 may be slid along conductors 182 and onto body 102. External threads 189 in hub nut 118 may then engage internal threads 188 in main nut 104 to secure body 102 and main nut 104 to hub nut 118.

Tightening of main nut 104 relative to hub nut 118 (e.g., by engaging both tool engaging surface on intermediate portion 191 and tool engagement surface 187 on main nut 104) may cause compression/engagement of grounding element 106 onto cable 180, thereby securing cable 180 within fitting 100. Such engagement may further cause O-ring 120 to be compressed between flange 131 and annular ribs 133/193 thereby effecting a liquid-proof seal between hub nut 118 and body 102.

As shown in FIG. 1A, forward end 192 of hub nut 118 may further include external threads formed on an outer surface thereof for engaging corresponding threads in a housing (e.g., junction box, transformer, etc.) or other structure for receiving fitting 100.

Returning to gland nut 112, as described briefly above, internal threads 186 in gland nut 112 may engage external threads 185 in main nut 104 to secure compression bushing 108 and cap guide 110 within fitting 100. As shown in FIGS. 1A and 1B, gland nut 112 may include a substantially tubular configuration having an forwardly angled inner surface 194 for engaging cap guide 110 and compression bushing 108 and urging them toward main nut 104 upon tightening of gland nut relative to main nut 104, e.g., via an outer tool engaging surface 195 on gland nut 112.

In one implementation, compression bushing 108 may include a substantially frustoconically-shaped elastomeric material having a bore 196 therethrough. The frustoconical shape may be configured to engage angled surface 194 in gland nut 112. Upon compression between gland nut 112 and main nut 104, an internal diameter of bore 196 may shrink. Thus, when cable 180 has been received within gland nut 112, bushing 108, and main nut 104, compression of bushing 108 may seal and secure cable 180 within fitting 100. By virtue of its elastomeric material, bushing 108 may adapt to retain cables having a variety of sizes.

Figure 4A:
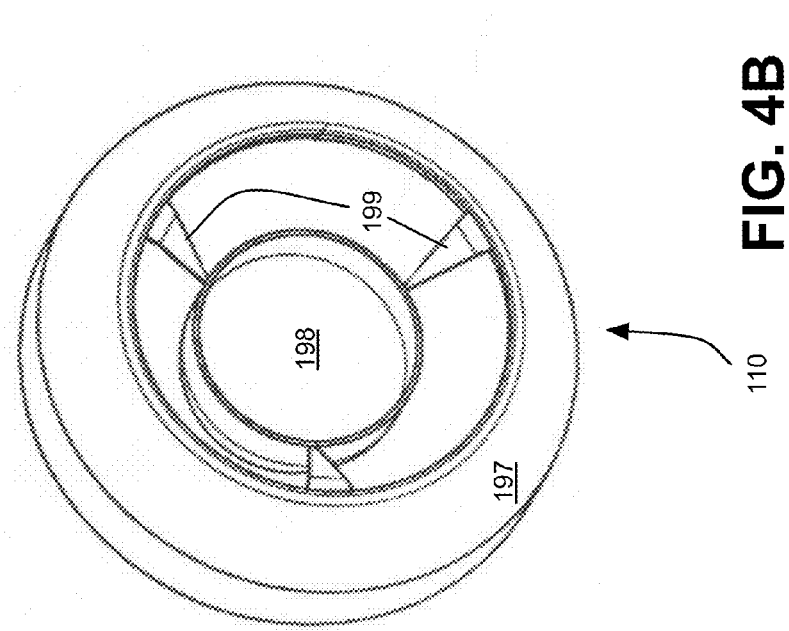
FIGS. 4A and 4B are front and rear isometric views, respectively, of an exemplary embodiment of the cap guide ring of FIG. 1A.
Figure 4B:
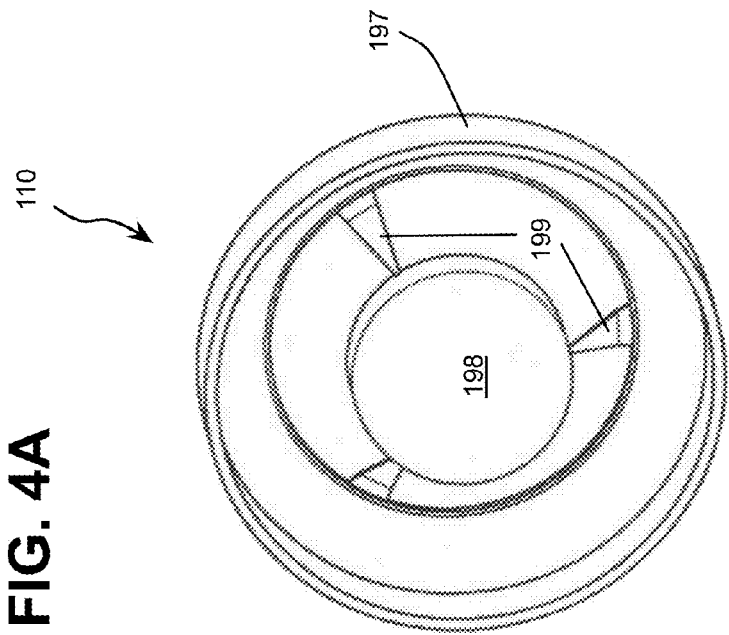

In one implementation, cap guide 110 may include an annular ring 197 and a cup-shaped portion 198 coupled to annular ring 197 via a number of break-away or detachable spokes 199. FIGS. 4A and 4B are front and rear isometric views, respectively, of an exemplary cap guide 110. As shown, in FIG. 4B, annular ring 197 may include an angled surface configured corresponding to angled inner surface 194 of gland nut 112 and also to the frustoconical shape of compression bushing 108. In this manner, upon initial assembly of gland nut 112 to main nut 104 (e.g. via corresponding threads 185/186), cap guide 110 may be secured within fitting 100.

Cup-shaped portion 198 may be configured to receive an end of conductors 182 as conductors 182 are introduced into fitting 100. During assembly, cable 180 may be pushed or inserted into fitting 100, which may cause conductors 182 to enter cup-shaped portion 198 of cap guide 110. Continued urging of cable 180 into fitting 100 may cause cup-shaped portion 198 to break away from annular ring 197. That is, spokes 199 may break off of cup-shaped portion 198, thus allowing cup-shaped portion 198 to precede conductors 182 through fitting 100.

Cup-shaped portion 198 may continue to engage the ends of conductors 182, as cable 180 is pushed through grounding element 106, body 102, and sealing barrier 138. In this manner, conductors 182 are prevented from splaying away from an axial orientation of cable 180 and potentially becoming stuck within body 102, such as by engaging a rearward end of sealing barrier 138. Moreover, cup-shaped portion 198 may provide a solid engagement surface for enabling easy insertion of cable 180 through barrier 138. After fully inserting cable 180 into fitting 100, cup-shaped portion 198 may be removed and discarded.

Figure 4C:
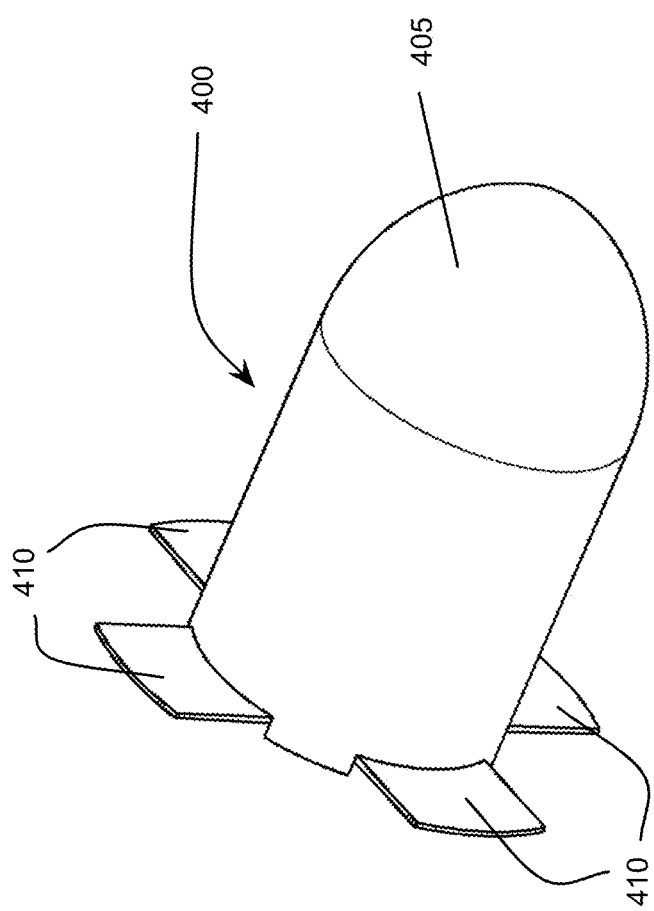
FIG. 4C is a front isometric view of another exemplary embodiment of the cap guide of FIG. 1A.

FIG. 4C is a front isometric view of an alternative cap guide element 400 consistent with implementations described herein. As shown in FIG. 4C, and contrary to the embodiments described above in relation to FIGS. 1A, 1B, 4A and 4B, cap guide element 400 may include a cup-shaped portion 405 and a number of foldable tabs 410 projecting outwardly from a rearward end of cup-shaped portion 405. Referring to fitting 100 described above in relation to FIG. 1A, upon initial assembly of gland nut 112 to main nut 104 (e.g. via corresponding threads 185/186), foldable tabs 410 may be secured within fitting between the rearward end of main nut 104 and the forward end of compression bushing 108.

In one embodiment (not shown), rearward end of main nut 104 may be configured to include a notched portion for initially retaining foldable tabs 410 therein.

Cup-shaped portion 405, similar to cup-shaped portion 198 described above, may be configured to receive an end of conductors 182 as conductors 182 are introduced into fitting 100. During assembly, cable 180 may be pushed or inserted into fitting 100, which may cause conductors 182 to enter cup-shaped portion 405 of cap guide element 400. Continued urging of cable 180 into fitting 100 may cause foldable tabs 410 to fold relative to cup-shaped portion 405, thereby allowing cup-shaped portion 405 to precede conductors 182 through fitting 100.

While FIGS. 1A-4C depict exemplary components of fitting 100, in other implementations, fitting 100 may include fewer, additional, different, or differently arranged components.

Figure 5A:
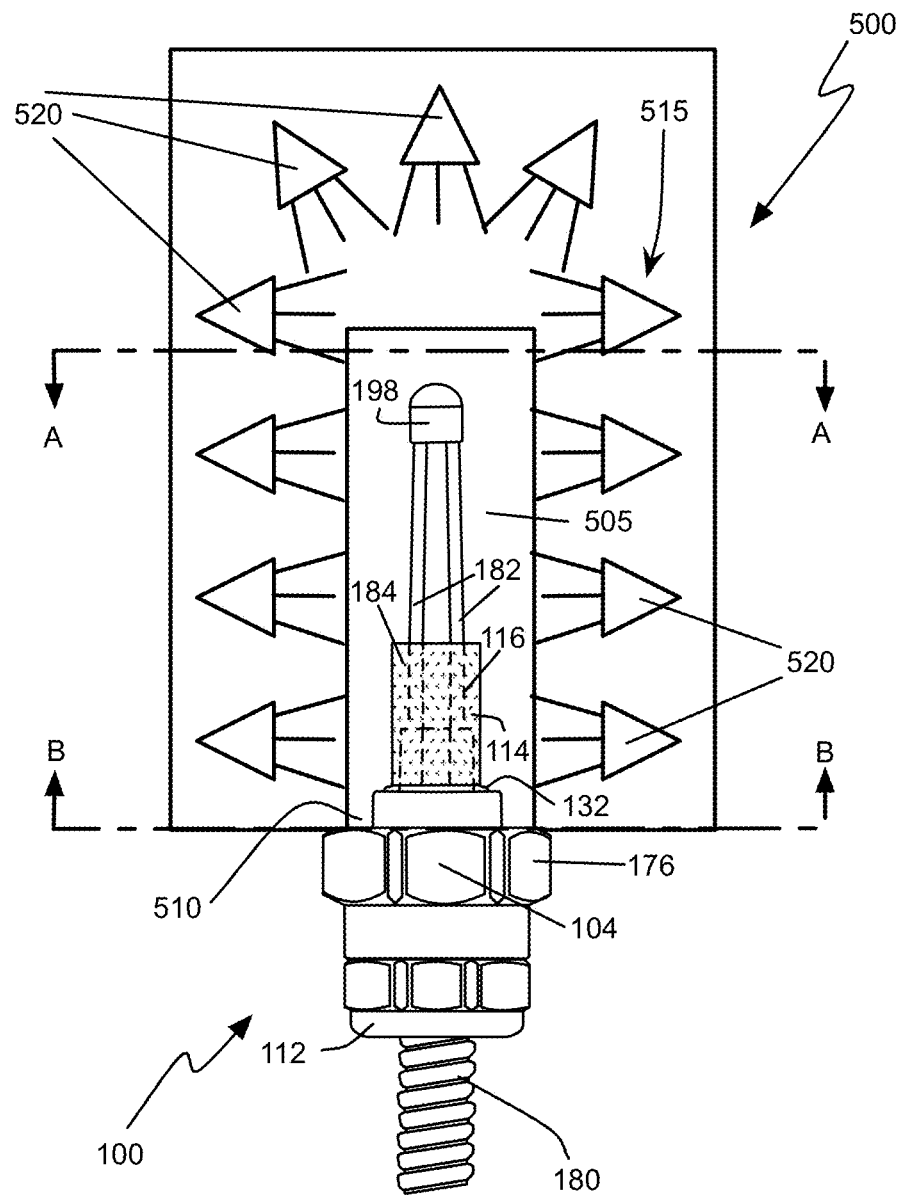
FIG. 5A is a side view of an exemplary sealing compound curing assembly consistent with implementations described herein.

FIG. 5A is a side view of an exemplary sealing compound curing assembly 500 consistent with implementations described herein. FIG. 5B is a top view of sealing compound curing assembly 500 taken along the line A-A in FIG. 5A. FIG. 5C is a bottom view of sealing compound curing assembly 500 taken along the line B-B in FIG. 5A, prior to insertion of fitting 100 therein. As shown, sealing compound curing assembly 500 may include a generally tubular or box-like configuration forming a curing chamber 505 that includes an access aperture 510 at one end thereof. For example, sealing compound curing assembly 500 may include a tubular structure having an inside diameter approximately one to two times the outside diameter of rearward end 132 of sealing sleeve 114. In one implementation, the inside diameter of curing chamber 505 may be smaller than the outside diameter of forward end 176 of main nut 104. Accordingly, upon insertion of sealing sleeve 114 into curing chamber 505, main nut 104 may act as a positive stop and may prevent over-insertion of fitting 100 into curing chamber 505.

As shown in FIG. 5A, sealing compound curing assembly 500 may include an array 515 of UV light sources 520. Array 515 may include a number of UV light sources sufficient to provide full 360° impingement of UV light onto sealing sleeve 114 of fitting 100, upon insertion of sealing sleeve 114 into curing chamber 505. For example, in one embodiment, array 515 may include approximately 30-35 UV light sources 520 arranged in a spaced relationship with respect to each other. As described above, sealing sleeve 114 and sealing cartridge 116 may be formed of a transparent material, such as a transparent plastic. By virtue of such construction, UV light from UV light sources 520 may fully impinge UV-curable sealing compound deposited or injected into sealing sleeve 114 upon initial assembly of fitting 100.

Consistent with embodiments described herein, UV light sources 520 may include a UV-A light source that may emit UV-A light having an intensity of between 20,000 and 90,000 microwatts per centimeter squared ($\mu W/cm^2$) at a distance of approximately six inches.

Sealing compound 184, consistent with embodiment described herein, may include any of a number of UV-curable materials, such as a multi-functional polyurethane material that undergoes cross-linking and UV light-induced polymerization in the presence of UV light from light sources 520. In one embodiment, UV-curable polyurethane acrylates may be synthesized by adding UV-reactive cross-linkers to a base sealing material. UV-curing of such a material emits a reduced number of volatile organic compounds (VOCs) when compared to non-UV-curable sealants. Further, in the presence of UV light, sealing compound 184 may fully harden more rapidly than high-temperature non-UV cured sealants. Also, consistent with embodiments described herein, curing of sealing compound 184 may be substantially temperature independent. That is, since sealing compound 184 fully activates and cures in the presence of UV light from UV light sources 520, curing of sealing compound 184 may not be limited to temperatures greater than 70°, as with other sealing compounds. For example, in some embodiments UV-curable sealing compound 184 may cure at temperatures lower than 20° F. In one implementation, UV compound 184 may be a transparent compound. That is, upon curing, compound 184 may form a hardened transparent seal within sleeve 114.

In an alternative configuration of sealing compound curing assembly 500 (not shown), a fewer number of UV light sources 520 may be provided in combination with one or more reflectors. For example, an interior surface of one side of curing chamber 505 may be provided with a mirrored surface, while an opposing side of curing chamber 505 may be transparent or open and may allow light from UV light sources 505 to impinge directly upon a first side of sealing sleeve 114. In such an embodiment, the mirrored surface of curing chamber 505 may cause light from light sources 520 to indirectly impinge an opposing side of sealing sleeve 114 and sealing cartridge 116 included therein. In some implementations, light source 505 may be a hand held UV lamp or flash light with a UV bulb. In any event, upon impingement of the UV light from light source(s) 505, UV-curable sealing compound 184 may cures in less than a minute.

As shown in FIG. 5C, access aperture 510 may include a flexible or resilient seal 525 for securing or maintaining fitting 100 positioned within curing chamber 505 upon insertion of sealing sleeve 114 into curing chamber 505. For example, as shown in FIG. 5C, resilient seal 525 may include a flexible curtain formed of a resilient, semi-rigid material and having a central aperture 530 therethrough. The flexible curtain may include one or more radial slits 535 formed therein, the slits allowing central aperture 530 to accommodate the insertion of cup-shaped portion 198, conductors 182, and sealing sleeve 114. In other implementations, seal 525 may be formed of a rubber or a polymer in which central aperture 530 is able to stretch to accommodate the insertion of cup-shaped portion 198, conductors 182, and sealing sleeve 114. In any event, upon insertion of cup-shaped portion 198, conductors 182, and sealing sleeve 114 into curing chamber 505 via central aperture 530, fitting 100 may remain inserted into chamber 505 until it is forceably removed therefrom.

Figure 6:
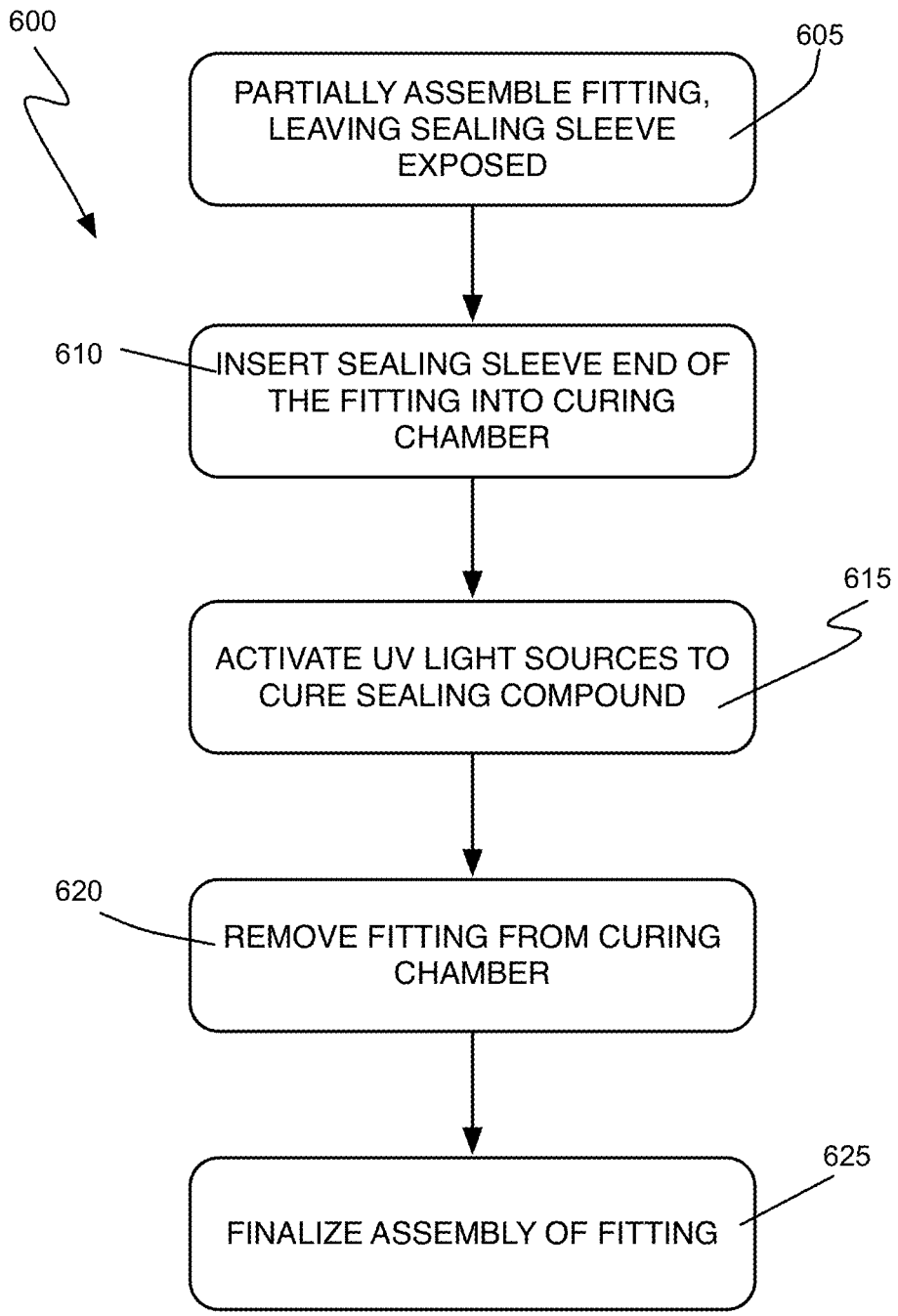
FIG. 6 is a flow diagram of an exemplary process for the fitting of FIG. 1A consistent with embodiments described herein.

FIG. 6 is a flow diagram of an exemplary process 600 for assembling an explosion-proof fitting consistent with embodiments described herein. Initially, process 600 may begin with fitting 100 being partially assembled (block 605). For example, as described above, grounding element 106 may be received into body 102, and main nut 104 may be loosely threaded onto body 102. Bushing 108 and cap guide 110 may be received within gland nut 112 and gland nut may be loosely threaded onto main nut 104. Then, conductors 182 may be received within gland nut 112 and may engage cup-shaped portion 198 of cap guide 110. Forward advancement of conductors 182 and cable 180 may cause conductors 182 to engage cup-shaped portion 198 and advance forward through fitting 100, exiting sleeve receiving portion 130 of body 102. Gland nut 112 and main nut 104 may be tightened, securing cable 180 within fitting 100.

As described above, conductors 182 may be received within notches 210/238 in sealing cartridge 116 and sealing cartridge may be received within sealing sleeve 114. Sealing sleeve may be placed into engagement with exiting sleeve receiving portion 130 of body 102 and sealing compound 184 may be injected into sealing sleeve 114 via central bore 202/232 of sealing cartridge.

Following partial assembly of fitting 100 (block 605), fitting 100 may be placed into a vertical configuration (e.g., with sealing sleeve 114 projecting upward) and sealing sleeve 114 may be received within curing chamber 505 of sealing compound curing assembly 500 (block 610). For example, cup-shaped portion 198, conductors 182, and sealing sleeve 114 may be inserted into curing chamber 505 via access aperture 510. As described above, access aperture 510 may include resilient seal 525 for securing or maintaining fitting 100 positioned within curing chamber 505 upon insertion of sealing sleeve 114 into curing chamber 505.

UV-lights 520 may be activated within sealing compound curing assembly 500 to cause UV light to impinge sealing sleeve 114 in a 360° manner to cure sealing compound 184 (block 615). Upon expiration of a curing time (e.g., approximately one minute or less), fitting 100 may be removed from curing chamber (505) (block 620) and the assembly of fitting 100 may be finalized (block 625). For example, hub nut 118 may be threaded onto main nut 104.

The foregoing description of exemplary embodiments provides illustration and description, but is not intended to be exhaustive or to limit the embodiments described herein to the precise form disclosed. Modifications and variations are possible in light of the above teachings or may be acquired from practice of the embodiments.

For example, various features have been mainly described above with respect to armored or metal clad electrical cables and connectors for such cables. In other embodiments, features described herein may be implemented in relation to other types of cables.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system for curing a sealing compound provided in an electrical fitting, comprising:
    a curing chamber configured to receive at least a portion of the electrical fitting therein,
    wherein the electrical fitting received within the curing chamber comprises:
        a fitting body having a central bore extending therethrough, a forward end, and a cable receiving end,
            wherein the central bore is configured to receive an electrical cable therethrough,
        a sealing sleeve configured to engage the forward end of the fitting body during assembly of the electrical fitting to receive two or more conductors of the electrical cable passing through the fitting body,
            wherein the sealing sleeve is configured to receive an ultra-violet (UV)-curable sealing compound therein, such that the UV-curable sealing compound flows between the two or more conductors during a filling of the sealing sleeve,
            wherein the sealing sleeve includes a transparent portion, and
        a sealing cartridge configured for receipt within the sealing sleeve prior to engagement of the sealing sleeve with the body,
            wherein the sealing cartridge includes a plurality of longitudinal notches therein, the plurality of longitudinal notches configured to receive the two or more conductors and to maintain the two or more conductors in a spaced relationship; and
    one or more UV light sources configured to provide UV light into the curing chamber to cure the UV-curable sealing compound,
        wherein the one or more of UV light sources is configured to initiate curing of the UV-curable sealing compound in the sealing sleeve.

2. The system of claim 1, wherein the sealing sleeve comprises a transparent or translucent material.

3. The system of claim 1, wherein the UV-curable sealing compound comprises a multi-functional polyurethane material.

4. The system of claim 1, wherein the UV-curable sealing compound comprises a synthesized polyurethane acrylate that includes UV-reactive cross-linkers.

5. The system of claim 1, wherein the plurality of UV light sources are configured to provide UV light into the curing chamber to cure the UV-curable sealing compound at a temperature of less than 70° Fahrenheit.

6. The system of claim 5, wherein the sealing cartridge includes a transparent portion.

7. The system of claim 6, wherein the sealing cartridge comprises a transparent or translucent material.

8. The system of claim 1, wherein the sealing cartridge further includes a sealant delivery tube, formed axially within a forward portion of the sealing cartridge, and configured to receive the sealing compound,
    wherein a rearward portion of the sealing cartridge includes a sealant receiving chamber coupled to the sealant delivery tube to allow the sealing compound to flow from the sealant delivery tube between the two or more conductors in the positioned in the plurality of longitudinal notches following an insertion of the sealing cartridge within the sealing sleeve.

9. The system of claim 8, wherein one or more of the longitudinal notches extend along an entire length of the sealing cartridge.

10. The system of claim 1, wherein the plurality of UV light sources comprises an array of UV light sources configured to provide 360° impingement of UV light on the sealing sleeve.

11. The system of claim 10, wherein each of the plurality of UV light sources is configured to emit UV-A light having an intensity of between 20,000 and 90,000 microwatts per centimeter squared at a distance of six inches.

12. The system of 1, wherein the curing chamber comprises a generally tubular structure for surrounding the fitting.

13. The system of claim 1, wherein the curing chamber is configured to receive the sealing sleeve following an engagement of the sealing sleeve with the body.

14. The system of claim 1, wherein the electrical fitting further comprises:
    a cap guide element initially positioned in the electrical fitting axially between a gland nut and a main nut,
    wherein the main nut is coupled to the fitting body and the gland nut is coupled to the main nut,
    wherein a forward advancement of the electrical cable through the gland nut causes the two or more conductors to engage the cap guide element, and
    wherein a continued forward advancement of the electrical cable in the electrical fitting causes the cap guide element to advance through the fitting and to maintain the two or more conductors in a grouped relationship as the electrical cable proceeds through the fitting.

15. The system of claim 1, further comprising:
a resilient seal formed at an aperture of the curing chamber.

16. A system, comprising:
an electrical fitting, comprising:
   a fitting body having a central bore extending therethrough,
   wherein the central bore is configured to receive an electrical cable therethrough;
   a sealing sleeve configured to engage the fitting body during assembly of the electrical fitting to receive two or more conductors of the electrical cable passing through the fitting body; and
   a sealing cartridge configured for receipt within the sealing sleeve prior to engagement of the sealing sleeve with the body,
   wherein the sealing cartridge includes a plurality of longitudinal notches therein, the plurality of longitudinal notches configured to receive the two or more conductors and to maintain the two or more conductors in a spaced relationship,
   wherein the sealing sleeve is configured to receive an ultra-violet (UV)-curable sealing compound therein, such that the UV-curable sealing compound flows between the two or more conductors during a filling of the sealing sleeve, and
   wherein the sealing sleeve and the sealing cartridge include at least transparent or partially transparent portions to facilitate impingement of UV light from one or more UV light sources onto the UV-curable sealing compound through the transparent or partially transparent portions of the sealing cartridge and the sealing sleeve;
a curing chamber for receiving at least the sealing sleeve; and
a UV light source to initiate curing of the UV-curable sealing compound within the curing chamber.

17. The system of claim 16, wherein the sealing sleeve engages a forward end of the fitting body.

18. The system of claim 16, wherein the UV light source comprises an array of UV light sources to provide 360° impingement of UV light on the sealing sleeve within the curing chamber.

19. The system of claim 18, wherein each of the UV light sources in the array of UV light sources emits UV-A light having an intensity of between 20,000 and 90,000 microwatts per centimeter squared at a distance of six inches.

20. The system of claim 18, wherein the array of UV light sources comprises a plurality of light sources and a plurality of reflectors.

21. The system of claim 16, wherein the curing chamber comprises:
an access aperture for receiving the sealing sleeve; and
a resilient seal formed at the access aperture of the curing chamber.

22. The system of claim 16, wherein the UV-curable sealing compound comprises a synthesized polyurethane acrylate that includes UV-reactive cross-linkers.

* * * * *

UNITED STATES PATENT AND TRADEMARK OFFICE
CERTIFICATE OF CORRECTION

| | |
|---|---|
| PATENT NO. | : 9,059,580 B2 |
| APPLICATION NO. | : 13/658418 |
| DATED | : June 16, 2015 |
| INVENTOR(S) | : Joey D. Magno, Jr. |

It is certified that error appears in the above-identified patent and that said Letters Patent is hereby corrected as shown below:

Claims

Claim 8, at column 12, line 39, should read: "more conductors positioned in the plurality of"

Signed and Sealed this
Twenty-seventh Day of October, 2015

Michelle K. Lee
*Director of the United States Patent and Trademark Office*